US006880781B2

United States Patent
Fabiani

(10) Patent No.: US 6,880,781 B2
(45) Date of Patent: Apr. 19, 2005

(54) HELICOPTER ELECTRIC CONNECTING UNIT, AND HELICOPTER EQUIPPED WITH SUCH A CONNECTING UNIT

(75) Inventor: Mario Fabiani, Ferno (IT)

(73) Assignee: Agusta S.p.A., Samarate (IT)

( * ) Notice: Subject to any disclaimer, the term of this patent is extended or adjusted under 35 U.S.C. 154(b) by 0 days.

(21) Appl. No.: 10/407,942

(22) Filed: Apr. 7, 2003

(65) Prior Publication Data

US 2003/0230668 A1 Dec. 18, 2003

(30) Foreign Application Priority Data

Apr. 12, 2002 (IT) .................................... TO2002A0330

(51) Int. Cl.$^7$ ............................................. B64C 27/68
(52) U.S. Cl. ....................... 244/17.11; 439/20; 403/371
(58) Field of Search ............................. 244/134 D, 131; 439/20–26; 403/16, 369–374.4; 416/5, 30; 310/232

(56) References Cited

U.S. PATENT DOCUMENTS

| 503,033 A | * | 8/1893 | Boorman .................... 403/303 |
| 1,431,295 A | * | 10/1922 | Evans .......................... 310/232 |
| 1,784,528 A | * | 12/1930 | Lidke et al. ............. 244/134 D |
| 2,480,222 A | * | 8/1949 | Carlson ....................... 403/370 |
| 2,638,295 A | * | 5/1953 | Sheets ..................... 244/134 D |
| 2,718,604 A | * | 9/1955 | Herrick ........................ 439/13 |
| 3,957,381 A | * | 5/1976 | Schafer .................... 403/374.4 |
| 4,348,132 A | * | 9/1982 | Mullenberg ................. 403/371 |
| 4,702,437 A | * | 10/1987 | Stearns, Jr. .............. 244/17.11 |
| 6,322,324 B1 | | 11/2001 | Kennedy et al. |

FOREIGN PATENT DOCUMENTS

| DE | 200 830 C | 7/1908 |
| GB | 683 979 A | 12/1952 |

* cited by examiner

Primary Examiner—Galen Barefoot
(74) Attorney, Agent, or Firm—Liniak, Berenato & White

(57) ABSTRACT

There is described an electric connecting unit for a helicopter, having a stator connected rigidly to a fixed part of the helicopter and fitted with first electric contact means; and a movable member rotated about a respective axis by a rotary member of the helicopter, and fitted with second electric contact means cooperating in sliding manner with the first electric contact means; the movable member having rigid fastening means for connection to the rotary member of the helicopter, so that no bearings are required between the stator and the movable member.

20 Claims, 2 Drawing Sheets

HELICOPTER ELECTRIC CONNECTING UNIT, AND HELICOPTER EQUIPPED WITH SUCH A CONNECTING UNIT

The present invention relates to a helicopter electric connecting unit, and to a helicopter equipped with such a connecting unit. More specifically, in the following description, reference is made purely by way of example to an electric connecting unit for connecting on-board instruments to a deicing device on the helicopter tail rotor blades, or to test flight sensors for determining rotor operating parameters.

BACKGROUND OF THE INVENTION

Connecting units of the above type are known which substantially comprise an axially symmetrical stator having a number of radial contact blades; and a movable member supported coaxially by the stator, rotated by helicopter tail rotor actuating means, and having annular conducting tracks which cooperate in sliding manner with the contact blades to connect the stator and movable member electrically.

More specifically, the stator is normally fixed rigidly to an outer casing of a power transmission unit interposed between the tail rotor hub and a drive unit of the helicopter.

The movable member, on the other hand, is supported radially by the stator by means of a number of bearings, and is rotated by a shaft of the tail rotor transmission unit.

A major drawback of connecting units of the above type lies in operating wear producing slack between the contacting components of the bearings supporting the movable member, thus altering the relative positions of the stator and movable member, and resulting in precarious, or even no, electric connection between the conducting tracks and sliding contacts.

SUMMARY OF THE INVENTION

It is an object of the present invention to provide a helicopter electric connecting unit designed to provide a straightforward, low-cost solution to the aforementioned drawback typically associated with known connecting units.

According to the present invention, there is provided an electric connecting unit for a helicopter, comprising a stator connected rigidly to a fixed part of said helicopter and having first electric contact means; and a movable member rotated about a respective axis by a rotary member of said helicopter, and having second electric contact means cooperating in sliding manner with said first electric contact means; characterized in that said movable member comprises rigid fastening means for connection to said rotary member of said helicopter.

The present invention also relates to a helicopter comprising a fixed part, at least one rotary member rotating with respect to said fixed part, and an electric connecting unit for connecting said rotary member and said fixed part electrically; said electric connecting unit comprising a stator connected rigidly to said fixed part of the helicopter and having first electric contact means; and a movable member rotated about a respective axis by said rotary member and having second electric contact means cooperating in sliding manner with said first electric contact means; characterized in that said movable member comprises rigid fastening means for connection to said rotary member.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
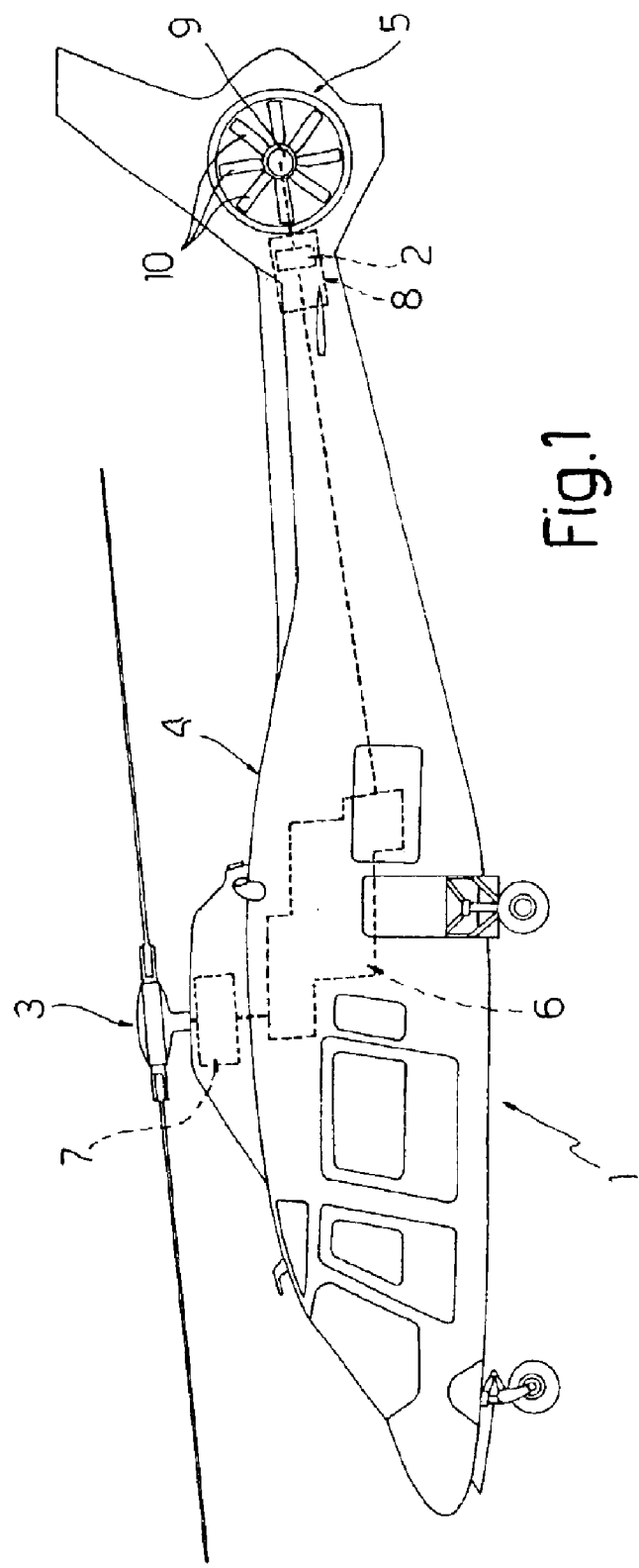
FIG. 1 shows a schematic side view of a helicopter featuring a connecting unit in accordance with the present invention.

With reference to FIG. 1, number 1 indicates as a whole a helicopter having an electric connecting unit 2 (FIGS. 1 and 2) in accordance with the present invention.

Helicopter 1 comprises, in known manner, a main rotor 3, fitted to an intermediate top portion of the fuselage 4, and a secondary tail rotor 5, both of which are powered by a drive unit 6 via respective transmission units 7, 8.

Connecting unit 2 is used to electrically connect the fixed part of helicopter 1 and the movable parts—in the example shown, secondary rotor 5.

In the example shown, connecting unit 2 provides for connecting the on-board instruments (not shown) to a deicing device (not shown) fitted to secondary rotor 5, or to the test flight sensors for determining operating parameters of secondary rotor 5.

As shown in FIG. 1, secondary rotor 5 comprises a central hub 9 connected angularly by transmission unit 8 to an output member (not shown) of drive unit 6; and a number of blades 10 fixed to and projecting radially from hub 9.

Figure 2:
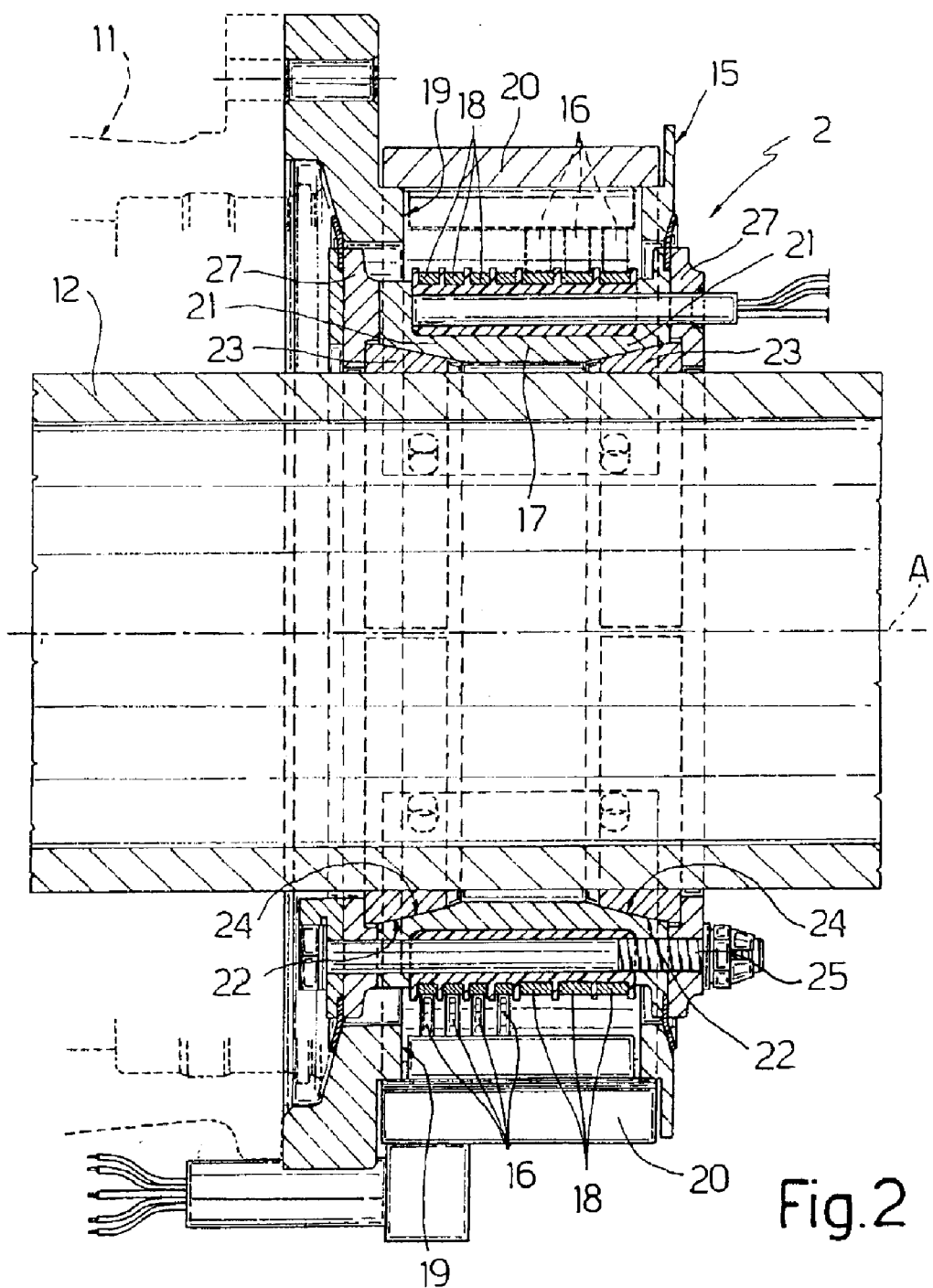
FIG. 2 shows a larger-scale axial section of the electric connecting unit according to the invention fitted to a transmission unit connected to the tail rotor of the helicopter.

With reference to FIG. 2, connecting unit 2 has an axis A, and is mounted between an outer casing 11 of transmission unit 8, and a shaft 12 of transmission unit 8, connected angularly to hub 9 of secondary rotor 5.

More specifically, connecting unit 2 substantially comprises a stator 15 connected rigidly, e.g. by screws (not shown), to casing 11 of transmission unit 8, and having a number of contact blades 16; and a movable member 17 rotated about axis A by shaft 12, and having a number of side by side, annular conducting tracks 18 cooperating in sliding manner with respective contact blades 16.

Stator 15 is substantially in the form of a cylindrical sleeve, and extends about shaft 12 with the interposition of movable member 17.

Stator 15 has two diametrically opposite, angular through openings 19 closed outwards by respective angular covers 20, each having a number of contact blades 16 projecting radially from stator 15 towards movable member 17.

More specifically, contact blades 16 of each cover 20 are arranged side by side and aligned in a direction parallel to axis A.

An important aspect of the present invention is that movable member 17 is fixed rigidly to shaft 12 and interposed radially between shaft 12 and stator 15.

Movable member 17 is substantially in the form of a cylindrical sleeve of axis A, and has conducting tracks 18 on a radially outer surface.

At opposite end portions 21, movable member 17 is bounded towards shaft 12 by respective conical surfaces 22 tapering towards each other and cooperating with respective bushes 23 wedged between movable member 17 and shaft 12.

More specifically, bushes 23 are fitted axially to shaft 12, and are bounded, towards end portions 21 of movable member 17, by respective conical surfaces 24 of the same shape as and cooperating with surfaces 22.

More specifically, bushes 23 have respective cross sections in the form of rectangular trapeziums, the minor bases of which are positioned facing each other and, like the major bases, extend radially with respect to axis A, and the oblique sides of which are positioned contacting respective surfaces 22 of movable member 17.

Bushes 23 are fitted tightly between shaft 12 and respective end portions 21 of movable member 17 by means of a number of bolts 25 fitted through respective through holes formed in movable member 17 and having axes parallel to axis A.

More specifically, bolts 25 provide for gripping two annular members 27 fitted radially loosely to shaft 12 and cooperating end to end with opposite ends of movable member 17 and with respective bushes 23.

The advantages of helicopter 1 and electric connecting unit 2 according to the present invention will be clear from the foregoing description.

In particular, by fitting movable member 17 rigidly and directly to shaft 12 of transmission unit 8, movable member 17 need no longer be supported radially by stator 15 by means of bearings, which may therefore be dispensed with, so that the relative position of the component parts of connecting unit 2 is more stable and less subject to wear.

Clearly, changes may be made to helicopter 1 and connecting unit 2 as described and illustrated herein without, however, departing from the scope of the accompanying claims.

What is claimed is:

1. An electric connecting unit (2) in a helicopter (1), comprising a stator (15) connected rigidly to a fixed part (11) of said helicopter (1) and having first electric contact means (16); and a movable member (17) rotated about a respective axis (A) by a rotary member (12) of said helicopter (1), and having second electric contact means (18) cooperating in sliding manner with said first electric contact means (16); characterized in that said movable member (17) comprises rigid fastening means (23, 25, 27) for connection to said rotary member (12) of said helicopter (1).

2. A unit as claimed in claim 1, characterized in that said stator (15) and said movable member (17) are mounted coaxially with each other; and in that said movable member (17) is interposed radially between said stator (15) and said rotary member (12).

3. A unit as claimed in claim 2, characterized in that said rigid fastening means (23, 25, 27) comprise two bushes (23) wedged tightly between said rotary member (12) and respective opposite end portions (21) of said movable member (17).

4. A unit as claimed in claim 3, characterized in that said rigid fastening means (23, 25, 27) comprise a number of bolts (25) for gripping said bushes (23) to the respective said end portions (21) of said movable member (17).

5. A unit as claimed in claim 3, characterized in that said end portions (21) of said movable member (17) are bounded towards said rotary member (12) by conical first surfaces (22) tapering towards each other; and in that said bushes (23) are bounded towards said movable member (17) by conical second surfaces (24) of the same shape as said first surfaces (22) and cooperating with the first surfaces (22).

6. A unit as claimed in claim 1, wherein said rigid fastening means comprises a mechanical fastening system interposed between said moveable member (17) and said rotary member (12).

7. A unit as claimed in claim 6, wherein said mechanical fastening system comprises at least one bushing (23) interposed between said movable member and said rotary member (12).

8. A unit as claimed in claim 6, wherein said mechanical fastening system comprises an interlocking member (25) interlocking said movable member (17) and said second electric contact means (18).

9. A unit as claimed in claim 1, wherein said rigid fastening means comprises a pair of angled bushes (23) interposed between said movable member and said rotary member (12).

10. A unit as claimed in claim 6, further comprising wherein said movable member comprises angled surfaces engaging said angled bushes (23) interposed between said movable member and said rotary member (12).

11. A helicopter comprising a fixed part (11), at least one rotary member (12) rotating with respect to said fixed part (11), and an electric connecting unit (2) for connecting said rotary member (12) and said fixed part (11) electrically; said electric connecting unit (2) comprising a stator (15) connected rigidly to said fixed part (11) of the helicopter (1) and having first electric contact means (16); and a movable member (17) rotated about a respective axis (A) by said rotary member (12) and having second electric contact means (18) cooperating in sliding manner with said first electric contact means (16); characterized in that said movable member (17) comprises rigid fastening means (23, 25, 27) for connection to said rotary member (12).

12. A helicopter as claimed in claim 11, characterized in that said stator (15) and said movable member (17) are mounted coaxially with each other; and in that said movable member (17) is interposed radially between said stator (15) and said rotary member (12).

13. A helicopter as claimed in claim 12, characterized in that said rigid fastening means (23, 25, 27) comprise two bushes (23) wedged tightly between said rotary member (12) and respective opposite end portions (21) of said movable member (17).

14. A helicopter as claimed in claim 13, characterized in that said rigid fastening means (23, 25, 27) comprise a number of bolts (25) for gripping said bushes (23) to the respective said end portions (21) of said movable member (17).

15. A helicopter as claimed in claim 13, characterized in that said end portions (21) of said movable member (17) are bounded towards said rotary member (12) by conical first surfaces (22) tapering towards each other; and in that said bushes (23) are bounded towards said movable member (17) by conical second surfaces (24) of the same shape as said first surfaces (22) and cooperating with the first surfaces (22).

16. A helicopter as claimed in claim 11, characterized in that said stator (15) is fixed rigidly to an outer casing (11) of a power transmission unit (8) interposed between a drive unit (6) and a rotor (5) of the helicopter (1); and in that said rotary member is a shaft (12) of said transmission unit (8).

17. A helicopter as claimed in claim 11, characterized in that said first electric contact means comprise a number of radial contact blades (16); and in that said second electric contact means comprise a number of annular conducting tracks (18) cooperating in sliding manner with respective said contact blades (16).

18. A helicopter as claimed in claim 11, wherein said rigid fastening means comprises a mechanical fastening system interposed between said movable member (17) and said rotary member (12).

19. A helicopter as claimed in claim 18, wherein said mechanical fastening system comprises at least one bushing (23) interposed between said movable member and said rotary member (12).

20. A helicopter as claimed in claim 18, wherein said rigid fastening means comprises a pair of angled bushes (23) interposed between said movable member and said rotary member (12).

* * * * *